United States Patent [19]

Robertson, Jr. et al.

[11] Patent Number: 4,583,029

[45] Date of Patent: Apr. 15, 1986

[54] VARIABLE SPEED RESISTIVE NETWORK FOR A PNEUMATIC SERVO ASSEMBLY OF AN ELECTRO-PNEUMATIC CONVERTER

[75] Inventors: John W. Robertson, Jr., Chesterland; Jane E. Smith, Mentor, both of Ohio

[73] Assignee: The Babcock & Wilcox Company, New Orleans, La.

[21] Appl. No.: 628,667

[22] Filed: Jul. 6, 1984

[51] Int. Cl.[4] .......... H02P 5/16

[52] U.S. Cl. .......... 318/481; 318/645

[58] Field of Search .......... 318/481, 257, 645, 335

[56] References Cited

U.S. PATENT DOCUMENTS

| | | | |
|---|---|---|---|
| 2,568,586 | 9/1951 | Hunt et al. | 318/481 X |
| 2,990,780 | 7/1961 | Kreuter | 318/481 X |
| 3,363,161 | 1/1968 | Marlow et al. | 318/481 |
| 3,971,973 | 7/1976 | Nakano | 318/257 X |
| 4,296,363 | 10/1981 | Blake et al. | 318/349 |
| 4,316,130 | 2/1982 | Louarn | 318/481 X |

*Primary Examiner*—B. Dobeck
*Attorney, Agent, or Firm*—Vytas R. Matas; Robert J. Edwards

[57] ABSTRACT

A resistive network is used for an electro-pneumatic converter so that the speed of the electro-pneumatic converter can be regulated. The converter includes a reversible DC servo motor having a pair of terminals connected to a pair of lines. The lines are selectively connectable to a common terminal of a power supply. The power terminal of the power supply is connected over a variable resistor to a terminal connecting the lines. Selectively connecting one of the lines to the common terminal causes electrical power to pass through the motor and one for an opposite direction to turn the motor shaft in a selected direction of rotation. The speed of rotation is determined by the position of the variable resistor. The motor shaft is used in conjunction with a cam that is associated with a nozzle supplied with pressurized gas over a bellows. The nozzle is moved closer or further away from the cam edge as the bellows expands or contracts. A line connected upstream of the bellows provides gas at a selected pressure which is porportional to the position of the cam. The position of the cam is determined by the rotation of the motor shaft.

4 Claims, 4 Drawing Figures

VARIABLE SPEED RESISTIVE NETWORK FOR A PNEUMATIC SERVO ASSEMBLY OF AN ELECTRO-PNEUMATIC CONVERTER

FIELD AND BACKGROUND OF THE INVENTION

The present invention relates in general to electro-pneumatic converters, and in particular to a new and useful servo assembly utilizing a variable speed resistive network that can be used to regulate the speed of the electro-pneumatic converter.

Electro-pneumatic converters utilize a motor which controls the operation of a pneumatic device. No known electro-pneumatic converter has a variable speed capacity as an integral portion of the device. Some manufacturers, in order to provide electro-pneumatic converters of different speeds, use various servomotor/gearbox arrangements in their devices. This means that the manufacturer must supply a different converter model for a different speed. Each model is capable of only supplying a specified speed.

SUMMARY OF THE INVENTION

The present invention relates to a resistive network which can be used in conjunction with the motor of an electro-pneumatic converter for changing the speed of the motor to change the speed of the electro-pneumatic converter. The inventive resistive network is used to limit the current and voltage supplied to the DC servo motor of the electro-pneumatic converter.

Accordingly, an object of the present invention is to provide a variable speed electro-pneumatic converter which comprises a reversible DC servo motor having a first terminal and a second terminal for receiving electrical power and a shaft which is rotatable in two opposite directions, pneumatic means cooperating with said shaft for supplying a gas pressure which is proportional to a position of said shaft, a pressure raising line connected to said first terminal, a pressure lowering line connected to said second terminal, and an electric power supply having a common terminal selectively connectable to one of the pressure raising line and the pressure lowering line with a power terminal at a different voltage from the common terminal. A resistor is connected between the raising and lowering lines and a separate resistor is connected in each raising and lowering line with variable resistor means connected between the power terminal and the electric power supply and a junction connecting the raising and lowering lines together.

The variable resistor means may be in the form of a multiposition switch or a plurality of switches each having one side connected to the power terminal and another side connected to one of a plurality of resistors which in turn are connected to the line terminal connecting the raising and lowering lines together.

A variable resistor might also be used as the variable resistor means.

Another object of the invention is to provide such a variable speed electro-pneumatic converter wherein a third resistor is connected between the raising and lowering lines to accommodate surges in electricity supplied over the motor.

A further object of the invention is to provide a variable speed electro-pneumatic converter which is simple in design, rugged in construction and economical to manufacture.

The various features of novelty which characterize the invention are pointed out particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
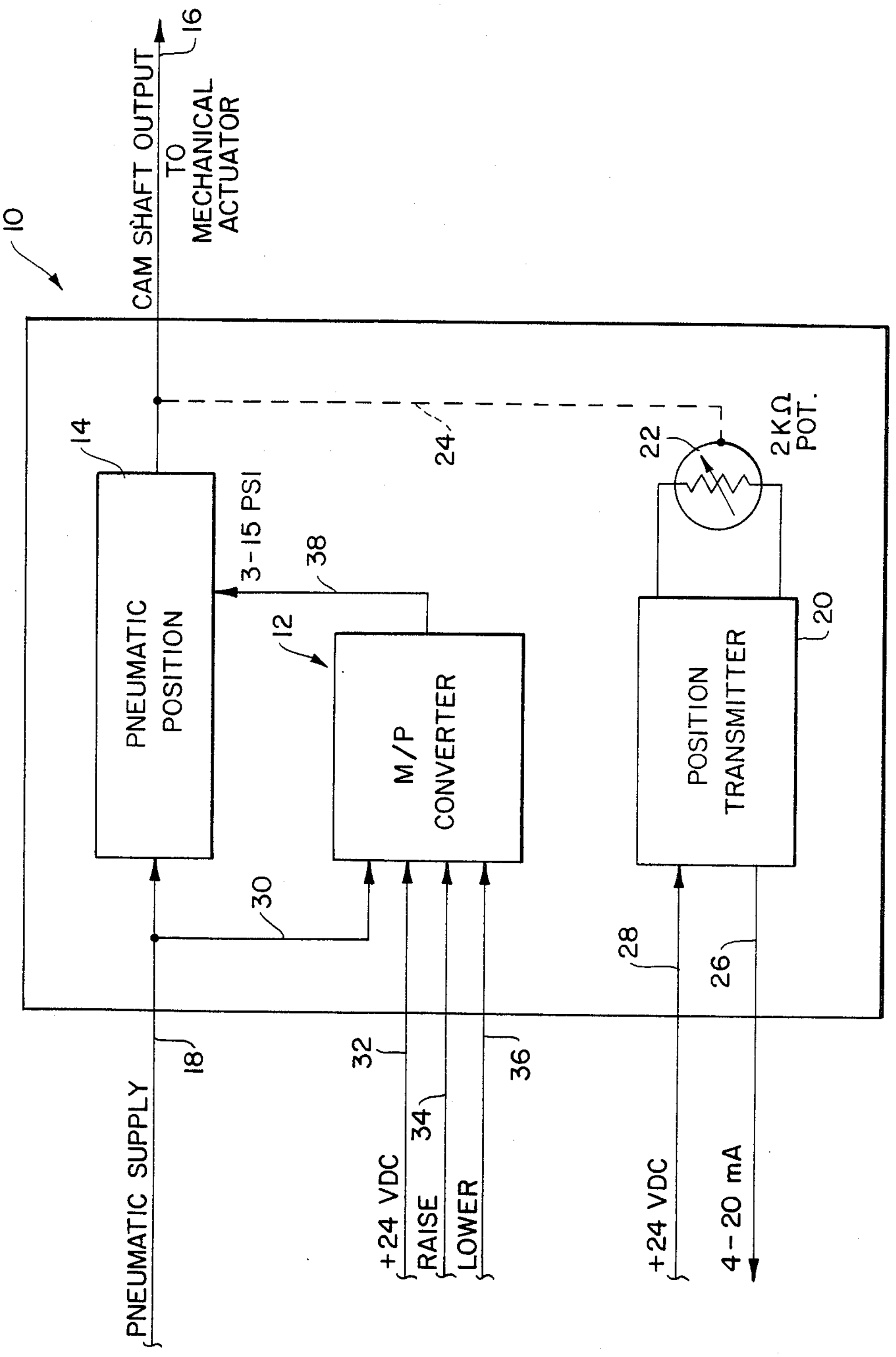
FIG. 1 is a block diagram showing a positioning device incorpating the variable speed electro-pneumatic converter of the invention.

Referring to the drawings in particular, the present invention comprises a variable speed electro-pneumatic converter generally designated 12 which can be utilized in a pneumatic positioner generally designated 10.

The pneumatic positioner includes a basic positioner known as a "Pneumatic Positioner" shown at 14 which has a cam shaft output for connection to a mechanical actuator at 16. Positioner 14 is connected to a static supply line 18 for supplying the pneumatic positioner with pressurized gas. The gas is generally air.

A position transmitter 20 includes a variable resistor 22 which has a slider that is mechanically connected to the shaft 16 over a schematically shown connection 24. By moving the slider of potentiometer 22, position transmitter generates a signal on 4–20 MA line 26 which is representative of the position of shaft 16. Position transmitter receives power over +24 VDC line 28.

The electro-pneumatic converter which is in the form of a motor-to-pneumatic converter (M/P converter) also receives pressurized gas over a line 30 connected to the pneumatic supply line 18, as well as electrical power over +24 VDC line 32. The M/P converter is also connected to a raise line 34 and lower line 36 which are selectively connectable to a common terminal (see FIG. 2). By connecting raise line 34 to the common terminal, the motor of the converter 12 rotates in one direction to increase the pressure of gas leaving converter 12 over line 38. By connecting the lower line 36 to the common terminal the motor shaft rotates in an opposite direction to decrease the pressure on line 38. The pressure on line 38 is generally between 3 and 15 psi and is proportional to the position of the motor in the converter 12 which in turn is proportional to the electrical signal supplied to the motor.

Figure 4:
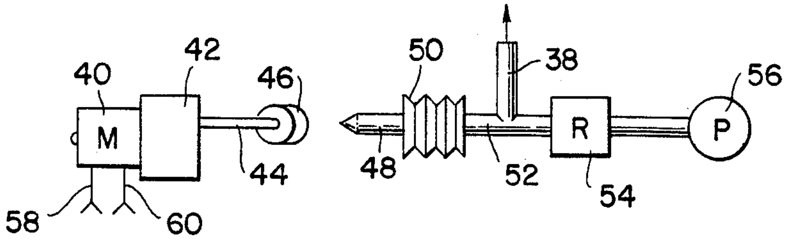
FIG. 4 is a diagrammatical representation of the motor and pneumatic means used in the electro-pneumatic converter of the present invention.

Referring now to FIG. 4, the motor 40 of the electro-pneumatic converter is in the form of a reversible DC servo motor. The shaft of motor 40 is connected to a gear 42 which has an output shaft 44 connected to a cam 46. Cam 46 faces the orifice of a nozzle 48. Nozzle 48 is connected to a spring biased bellows 50 having an input line 52 communicating with the interior of the bellows 50 as well as the interior of nozzle 48. Line 38 for supplying a pneumatic gas at a controlled pressure is connected to line 52. Lines 38 and 52 receive gas (generally air) at a constant low pressure of 22 psi ±2 psi, from regulator 54. Regulator 54 receives pressurized gas from a pump or other gas supply 56.

The rotational position of shaft 44 as controlled by gear or gear reduction unit 42 is ultimately controlled by the shaft of motor 40. The shaft of motor 40 turns in one direction or an opposite direction and at a selected speed which is determined by the electrical power supplied to the motor over lines 58 and 60.

Figure 2:
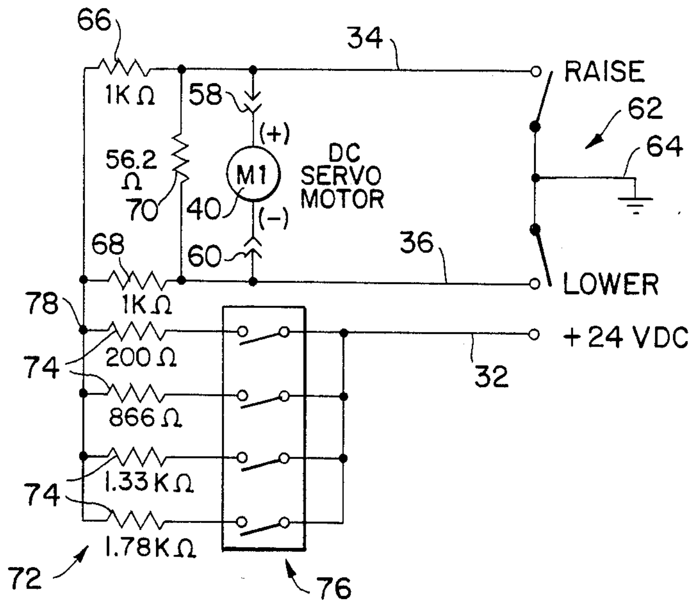
FIG. 2 is a schematic representation of the servomotor and resistive motor control utilized in the electro-pneumatic converter of the invention.

Referring now to FIG. 2, the resistive speed control for motor 40 includes the raise line 34 which is in the form of a pressure raising line and the lower line 36 in the form of a pressure lowering line. These two lines are selectively connected by switch means generally designated 62, to a common terminal 64. Common terminal 64 is at a voltage (generally ground voltage) different from power line 32.

Terminal 58 of motor 40 is connected to raise line 34 and terminal 60 of motor 40 is connected to lower line 36.

A first resistor 66 is connected in line 34 and a second resistor 68 is connected in line 36. These resistors might both, for example, be 1,000 ohm resistors. A shunting resistor 70 which is for example, 56.2 ohms, is also connected between lines 34 and 36 and parallel to motor 40. This resistor provides stabilization of the voltage drop across the DC motor which is necessary due to the dynamic resistive changes which the motor experiences and which is caused by friction in the reduction gear 42.

A variable speed for the electro-pneumatic converter 12, in general, and the motor 40 in particular, is achieved by providing variable resistor means generally designated 72. Resistor means 72 comprises four separate resistors 74 which are respectively connected to four switches in a four position dip switch 76. The other side of each switch is connected to the power line 32. By selecting one or more resistors 74 by closing one or more of the switches for position switch 76, a variety of voltage levels can be provided to a common terminal 78 connecting the resistors 66, 68 together.

Figure 3:
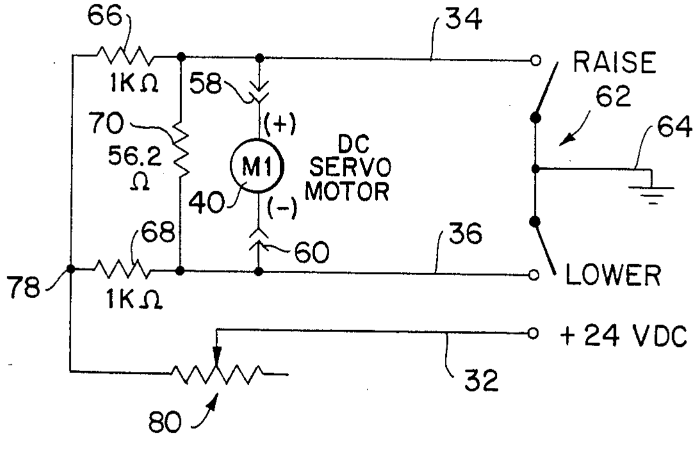
FIG. 3 is a view similar to FIG. 2 of another embodiment of the invention.

The embodiment of FIG. 3 is substantially the same as the embodiment of FIG. 2, so that the same numerals are used to designate the same or similar parts. Additional explanation of these parts will not be provided. The embodiment of FIG. 3 differs from the embodiment of FIG. 2 in that the variable resistor means 72 instead of comprising a plurality of discrete resistors, comprises a single variable resistor 80 having a slider (or conversely a resistor) connected to the power line 32 and a resistor (or conversely the slider) connected to the common or line terminal 78.

The variable speed electro-pneumatic converter of the invention operates as follows:

A selected resistance is first chosen for resistor means 72 in FIG. 2 or variable resistor 80 in FIG. 3. Then, if it is desired to raise the pressure on line 38 in FIG. 4, the raise line 34 is connected to the common terminal 64 by placing switch means 62 in an appropriate position. Voltage and current is then supplied by line 32 over the selected resistance of resistor means 72 or 80, to the line terminal 78. Current then flows over resistor 68, to terminal 60, through motor 40, to terminals 58 and through line 34 to the common terminal 64. This rotates the shaft of motor 40 in one direction and at a selected speed to regulate the pressure on line 38.

The shaft of motor 40 is reversed by opening the connection between line 34 and common terminal 64 and closing the connection between common terminal 64 and line 36. The flow of current is then reversed in DC servo motor 40 to reverse the rotation of its shaft.

In a further embodiment of the invention, rather than regulating the voltage in variable resistor means 72 or 80, the power supply of line 32 can be regulated.

The pressure on line 38 as shown in FIG. 4 is regulated in accordance with a rotational position of cam 46 which is determined by shaft 44 of reduction gear 42. Gas supplied by regulator 54 to line 52 inflates bellows 50 against the biasing of its spring to move nozzle 48 toward the top of cam 46. A dynamic equilibrium will be achieved at some point during the approach of nozzle 48 to the top of cam 46. This will establish a back pressure in bellows 50 which will determine the pressure on line 38. By changing the position of cam 46, the pressure on line 38 is changed in proportion to the electrical power which was supplied to the motor 40 by its terminals 58, 60.

A first important advantage in the invention is in its cost savings which results in the elimination of having to purchase and/or stock a variety of servo motor/gearing mechanisms and converter models for providing different desired speeds. With the resistive network of FIGS. 2 or 3, only one servo motor/gearing mechanism is needed. The cost of buying and stocking resistors is minimal compared to that required for servo motors.

A second advantage is that the speed is field adjustable. It is no longer necessary to order difference converters for providing different speeds where the required speed is different from the speed originally specified on the converter.

While specific embodiments of the invention have been shown and described in detail to illustrate the application of the principles of the invention, it will be understood that the invention may be embodied otherwise without departing from such principles.

What is claimed is:

1. A variable speed electro-pneumatic converter comprising:

a reversible DC servo motor having a first terminal and a second terminal for receiving electrical power, and a shaft which is rotatable in two opposite directions;

pneumatic means cooperating with said shaft for supplying gas at a pressure which is proportional to the rotation of said shaft;

a pressure raising line connected to said first terminal;

a pressure lowering line connected to said second terminal;

an electric power supply having a common terminal and a power terminal at a voltage different from said common terminal;

switch means selectively connecting said common terminal to one of said pressure raising and pressure lowering lines;

a first resistor in said pressure raising line;

a second resistor in said pressure lowering line;

a line terminal connected between said pressure raising and pressure lowering lines on a side of said first and second resistors opposite from said first and second motor terminals;

variable resistor means connected between said line terminal and said power terminal for applying a selected resistance between said power terminal and line terminal to drive said motor shaft in one direction with one of said pressure raising and pressure lowering lines connected to said common terminal and in an opposite direction with the other of said pressure raising and pressure lowering lines connected to said common terminal; and said pneumatic means comprises a reduction gear connected to said motor shaft and having a gear shaft, a cam connected to said motor shaft, a nozzle mounted proximated to said cam and movable toward and away from said gear shaft, a bellows connected to said nozzle for moving said nozzle, a gas pressure supply connected to said bellows for supplying a selected constant pressure to said bellows and a pressure supply line connected to said bellows for supplying gas at a selected pressure whereby gas supplied through said nozzle is selectively restricted by said cam to regulate a position of said bellows and produce a back pressure in said bellows.

2. A converter according to claim 1, including a shunt resistor connected between said pressure raising and pressure lowering lines on a side of said first and second resistors adjacent said first and second motor terminals and across said motor.

3. A converter according to claim 2, wherein said variable resistor means comprises a plurality of discrete resistors each having one side connected to said line terminal and an opposite side, and a separate switch connected to each opposite side of each discrete resistor, each switch connected to said power terminal.

4. A converter according to claim 2, wherein said variable resistor means comprises a variable resistor connected between said power terminal and said line terminal.

* * * * *